United States Patent
Todd et al.

(10) Patent No.: US 10,698,879 B1
(45) Date of Patent: Jun. 30, 2020

(54) DATA MANAGEMENT FOR EXTENDED MULTI-CLOUD ENVIRONMENT

(71) Applicant: EMC IP Holding Company LLC, Hopkinton, MA (US)

(72) Inventors: Stephen Todd, Shrewsbury, MA (US); Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 15/730,990

(22) Filed: Oct. 12, 2017

(51) Int. Cl.
  *G06F 17/00* (2019.01)
  *G06F 16/23* (2019.01)
  *H04L 29/08* (2006.01)
  *G06F 16/13* (2019.01)
  *G06F 16/11* (2019.01)

(52) U.S. Cl.
  CPC ........ *G06F 16/2358* (2019.01); *G06F 16/137* (2019.01); *H04L 67/1097* (2013.01); *G06F 16/11* (2019.01)

(58) Field of Classification Search
  CPC .... G06F 16/137; G06F 16/2358; G06F 16/11; H04L 67/1097
  See application file for complete search history.

(56) References Cited

U.S. PATENT DOCUMENTS

2017/0316391 A1* 11/2017 Peikert .................... H04L 9/006
2018/0337695 A1* 11/2018 Frankel ................ H04L 9/0825

OTHER PUBLICATIONS

Satoshi Nakamoto, "Bitcoin: A Peer-to-Peer Electronic Cash System,"https://bitcoin.org/bitcoin.pdf, 2008, 9 pages.
Juan Benet, "IPFS—Content Addressed, Versioned, P2P File System (DRAFT 3)," http://static.benet.ai/t/ipfs.pdf, Jul. 14, 2014, 11 pages.

* cited by examiner

*Primary Examiner* — Syed H Hasan
(74) *Attorney, Agent, or Firm* — Ryan, Mason & Lewis, LLP (57) ABSTRACT

In an extended cloud computing environment comprising a plurality of computing resources associated with an enterprise, a method maintains a distributed ledger integrated with a data sharing system, wherein a given node associated with the distributed ledger and a given node associated with the data sharing system are associated with a given one of the plurality of computing resources in the extended cloud computing environment. The method manages one or more data sets processed by the plurality of computing resources in association with the distributed ledger and the data sharing system, wherein managing comprises storing transactions associated with the one or more data sets on the distributed ledger to enable one or more of the plurality of computing resources to access the stored transactions.

20 Claims, 7 Drawing Sheets

632 — IN AN EXTENDED MULTI-CLOUD ENVIRONMENT COMPRISING A PLURALITY OF COMPUTING RESOURCES ASSOCIATED WITH AN ENTERPRISE, MAINTAIN A DISTRIBUTED LEDGER INTEGRATED WITH A DATA SHARING SYSTEM, WHEREIN A GIVEN NODE ASSOCIATED WITH THE DISTRIBUTED LEDGER AND A GIVEN NODE ASSOCIATED WITH THE DATA SHARING SYSTEM ARE ASSOCIATED WITH A GIVEN ONE OF THE PLURALITY OF COMPUTING RESOURCES IN THE EXTENDED MULTI-CLOUD ENVIRONMENT

634 — MANAGE ONE OR MORE DATA SETS PROCESSED BY THE PLURALITY OF COMPUTING RESOURCES IN ASSOCIATION WITH THE DISTRIBUTED LEDGER AND THE DATA SHARING SYSTEM, WHEREIN MANAGING COMPRISES STORING TRANSACTIONS ASSOCIATED WITH THE ONE OR MORE DATA SETS ON THE DISTRIBUTED LEDGER TO ENABLE ONE OR MORE OF THE PLURALITY OF COMPUTING RESOURCES TO ACCESS THE STORED TRANSACTIONS

FIG. 7

DATA MANAGEMENT FOR EXTENDED MULTI-CLOUD ENVIRONMENT

FIELD

The field relates generally to networks of computing resources, and more particularly to techniques for data management in such networks of computing resources.

BACKGROUND

Enterprises such as corporations typically have a large information technology (IT) infrastructure comprising a network of computing resources distributed across a geographic environment. Such computing resources may be diverse in nature including, but not limited to, cloud platforms, data centers, employee devices, customer devices, etc.

Centralized data management of such IT infrastructure has been the norm for many decades. However, with increased decentralization of such IT infrastructure, e.g., due to the proliferation of additional computing resources such as edge servers, gateways, and endpoint devices such as Internet of Things (IoT) devices now being part of the IT infrastructure (referred to as an "extended multi-cloud environment"), centralized data management has become much more difficult, if not impossible.

SUMMARY

Embodiments of the invention provide systems and methods for decentralized data management in an extended cloud computing environment.

For example, in one embodiment, a method comprises the following steps. In an extended cloud computing environment comprising a plurality of computing resources associated with an enterprise, the method maintains a distributed ledger integrated with a data sharing system, wherein a given node associated with the distributed ledger and a given node associated with the data sharing system are associated with a given one of the plurality of computing resources in the extended cloud computing environment. The method manages one or more data sets processed by the plurality of computing resources in association with the distributed ledger and the data sharing system, wherein managing comprises storing transactions associated with the one or more data sets on the distributed ledger to enable one or more of the plurality of computing resources to access the stored transactions.

Advantageously, illustrative embodiments utilize decentralized data management techniques in an extended cloud computing environment (e.g., multi-cloud implementations) to overcome drawbacks associated with a centralized data management approach.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

Illustrative embodiments provide techniques for decentralized data management using a distributed ledger integrated with a data sharing system. The term "computing resource," as illustratively used herein, can refer to any device, endpoint, component, element, platform, cloud, data center, storage array, client, server, gateway, or other resource, that is part of an IT infrastructure associated with an enterprise. An information processing system that comprises such diverse and distributed computing resources is referred to as an "extended multi-cloud environment." An example of an extended multi-cloud environment is shown in FIG. 1.

Figure 1:
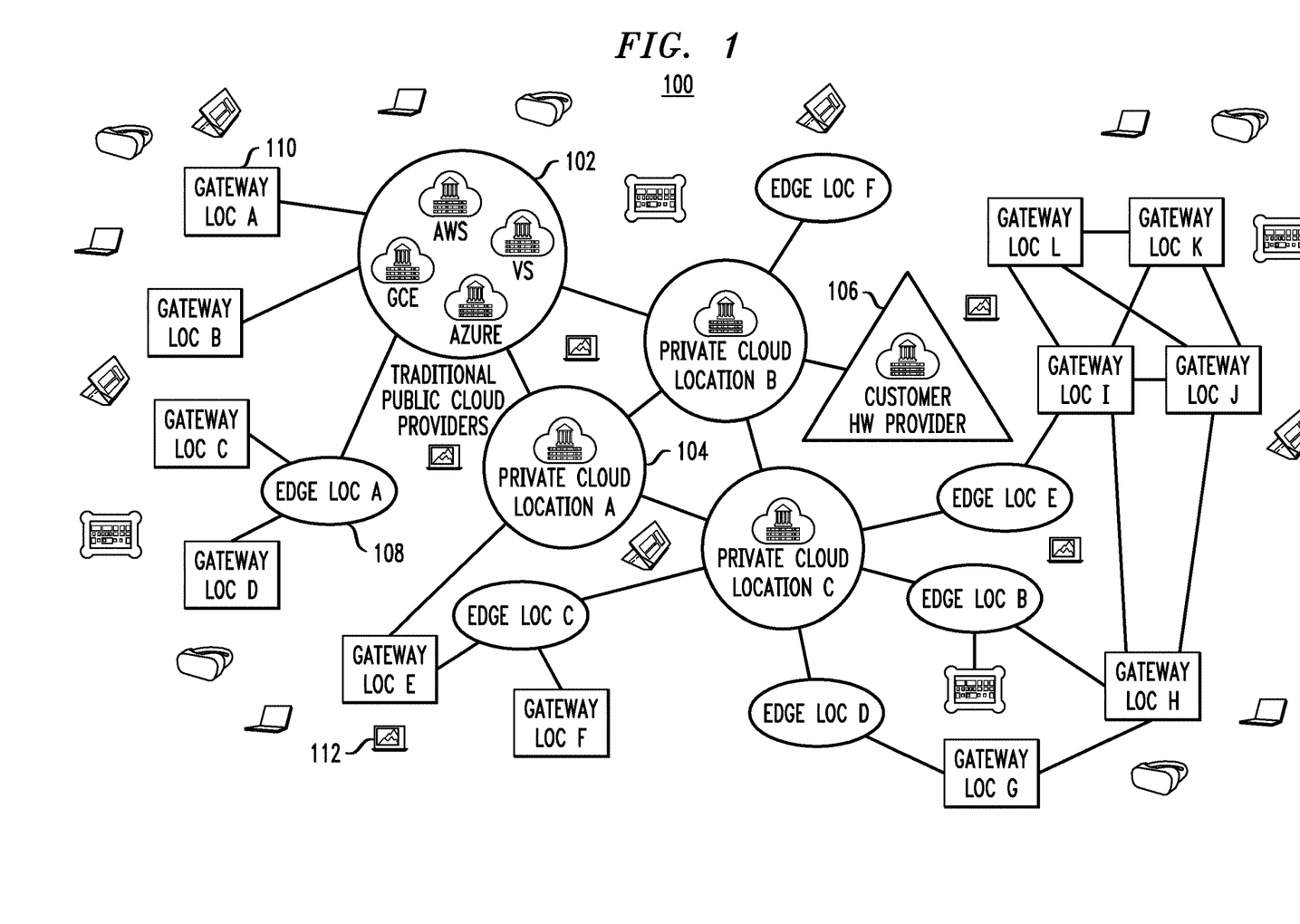
FIG. 1 illustrates a network of computing resources associated with an enterprise with which one or more illustrative embodiments may be implemented.

As shown in FIG. 1, extended multi-cloud environment 100 comprises a plurality of computing resources (including compute/network/storage resources and networks that connect them). More particularly, the plurality of computing resources of extended multi-cloud environment 100 may include public clouds (an example of which is labeled 102) and/or private clouds (an example of which is labeled as 104) illustrated as circles in FIG. 1. Note that specific cloud infrastructure may be purpose-built to serve as a destination for cloud native applications while some may be purpose-built for traditional applications. Examples of public clouds may include, but are not limited to, Amazon Web Services® (AWS), Google Compute Engine® (GCE), and Windows Azure® Services platforms. Further, the plurality of computing resources of extended multi-cloud environment 100 may also include: specialty (custom) hardware (an example of which is labeled as 106) that may or may not have cloud-like access methods and is illustrated as a triangle in FIG. 1; edge environment devices (an example of which is labeled as 108) illustrated as ovals in FIG. 1; and clusters of gateway devices (an example of which is labeled as 110) illustrated as rectangles in FIG. 1. Still further, the plurality of computing resources of extended multi-cloud environment 100 may include a plurality (e.g., hundreds, thousands, etc.) of employee or customer access points (an example of which is labeled as 112), e.g., wired or wireless mobile devices, tablets, laptops, augmented reality (AR)/virtual reality (VR) devices, etc. The extended multi-cloud environment 100 may also include heterogeneous and varied network connections, from carrier-grade service level agreement (SLA)-capable networks to torrent-like, unreliable, peer-to-peer networks.

It is realized herein that the complexity of extended multi-cloud environments, such as the example shown in FIG. 1, leads to significant data management challenges. Some of these challenges are as follows.

It is realized that, in an extended multi-cloud environment, the amount of data creation, processing, and deletion on endpoint devices, gateways, and the edge servers is continuously growing. These devices often have data coming in so fast that they need to make immediate choices on which data to keep and which data to delete. The computing resources making these choices often cannot rely on contacting a central arbiter, as with existing data management approaches, to assist in the decision. Thus, enterprises have little to no visibility into this scenario, and valuable data assets may be forever lost due to such a compressed data lifecycle.

Further, the quality and service levels of extended networking environments are lower than many public cloud providers. As a result, endpoint and gateway devices, for example, may continually process data and make data deletion decisions while completely (or even partially) disconnected from the overall corporate environment due to such unreliable network connectivity.

Also, not only is it currently not possible with existing data management approaches to catalog the data assets that exist across the entire extended multi-cloud portfolio, but it is also not possible to view deletion activity that is occurring within the extended multi-cloud environment.

Given that data is more transient in an extended multi-cloud environment, there is no capability with existing data management approaches to semantically understand, at any given point in time, what type of data sets are currently available to the enterprise. It is also not possible to know what type of data sets have been deleted.

Cloud computing systems are capable of storing troves of static content coming in from extended clouds. As a result of frequent deletions, it is virtually guaranteed that the edge server will throw away data that the cloud would view as valuable. There is no feedback loop with existing data management approaches for informing the cloud what was thrown away, and instructing the edge server of what would be valuable to keep.

Given the wide disparity of hardware and software configurations of endpoints and gateways, it is near impossible with existing data management approaches to establish uniform data transfer capabilities between multiple clouds and their extensions.

Still further, the sheer scale of devices that are contributing to the cloud make it difficult with existing data management approaches to prevent rogue endpoint devices or gateways from joining an extended multi-cloud environment and proliferating incorrect or corrupt data sets to the cloud.

Illustrative embodiments overcome the above and other drawbacks associated with existing centralized data management approaches. More particularly, illustrative embodiments provide techniques for decentralized data management using a distributed ledger integrated with a data sharing system.

Figure 2:
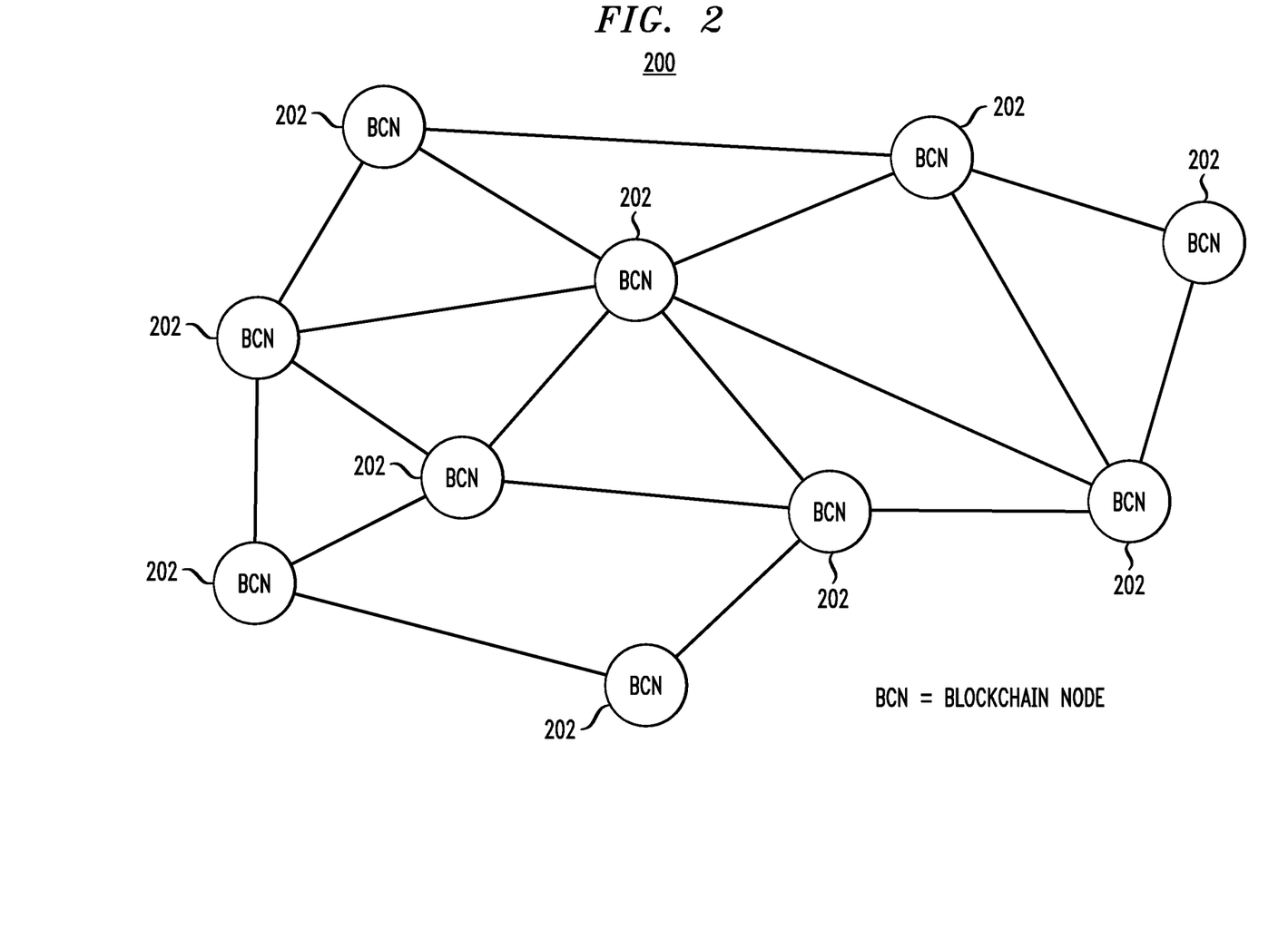
FIG. 2 illustrates a distributed ledger system for managing data associated with a plurality of computing resources, according to an illustrative embodiment.

FIG. 2 illustrates a distributed ledger system 200 for managing data associated with a plurality of computing resources, according to an illustrative embodiment. As generally illustrated, a plurality of blockchain nodes (BCNs), each labeled 202, are operatively coupled to form a distributed ledger system.

As used herein, the terms "blockchain," "digital ledger" and "blockchain digital ledger" may be used interchangeably. As is known, the blockchain or digital ledger protocol is implemented via a distributed, decentralized computer network of compute nodes (e.g., BCNs 202). The compute nodes are operatively coupled in a peer-to-peer communications protocol (e.g., as illustratively depicted as system 200 in FIG. 2). In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

Accordingly, it is to be understood that each computing resource (e.g., 102, 104, 106, 108, 110 and 112) shown in the extended multi-cloud environment 100 in FIG. 1 either hosts thereon or is otherwise in communication with at least one of the BCNs 202 in FIG. 2. That is, each computing resource in environment 100 is configured to store one or more transactions on the distributed ledger at a corresponding BCN 202 such that the one or more transactions are immutably stored on the distributed ledger and securely accessible by the plurality of BCNs 202. In illustrative embodiments, examples of transactions that each computing resource can store on the distributed ledger include, but are not limited to, metadata about one or more incoming data sets, metadata about one or more deleted data sets, other metadata that would be useful for an enterprise to know about data being processed by each computing resource in the extended multi-cloud environment 100. As used herein, "metadata" is generally understood to refer to any data that describes, defines or otherwise characterizes other data.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 3:
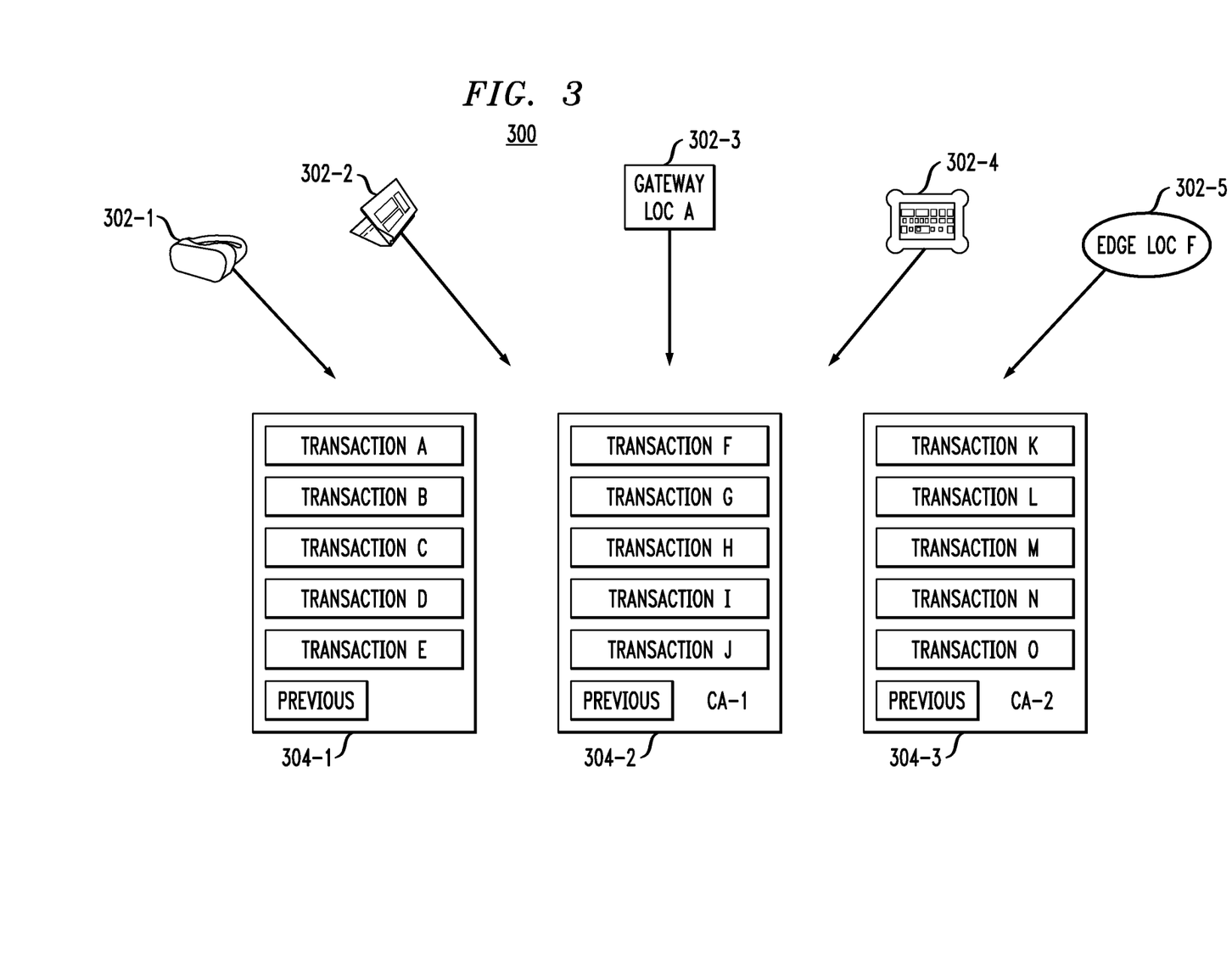
FIG. 3 illustrates at least part of a distributed ledger of a distributed ledger system for managing data associated with a plurality of computing resources, according to an illustrative embodiment.

FIG. 3 illustrates at least part of a distributed ledger 300 of a distributed ledger system for managing data associated with a plurality of computing resources, according to an illustrative embodiment. As shown, a set of computing resources (e.g., from extended multi-cloud environment 100) 302-1, 302-2, 302-3, 302-4 and 302-5 contribute transactions to a distributed ledger that is represented as blocks 304-1, 304-2 and 304-3.

Thus, when a distributed ledger protocol is deployed on extended multi-cloud components (e.g., endpoint devices, gateways, etc. as shown as computing resources 302-1, 302-2, 302-3, 302-4 and 302-5), data-oriented transactions can be added locally to the ledger. As depicted in FIG. 3, a set of local transactions are generated by computing resources 302-1, 302-2, 302-3, 302-4 and 302-5 and these transactions are aggregated in accordance with the distributed ledger protocol (e.g., blockchain protocol) into a chain of blocks 304-1, 304-2 and 304-3. Note that block 304-1 is referred to as a genesis block (first block in the blockchain) and is linked with the subsequent blocks 304-2 which is linked to block 304-3. CA refers to content address which refers to the hash value of the previous block. Thus, CA-2 in block 304-3 refers to a hash value of block 304-2, and CA-1 in block 304-2 refers to a hash value of block 304-1. Since block 304-1 is the genesis (first) block, it has no previous block hash value to reference.

Advantageously, such a distributed ledger 300 can be extended across all components within an extended multi-cloud environment, including traditional cloud computing platforms (i.e., all of the computing resources 102 through 112 in FIG. 1).

As explained above, illustrative embodiments provide decentralized data management in an extended multi-cloud environment (such as, for example, environment 100 in FIG. 1) using a distributed ledger (such as, for example, distributed ledger system 200/300 in FIGS. 2 and 3) integrated with a data sharing system. Illustrative embodiments of a data sharing system will now be described.

Figure 4:
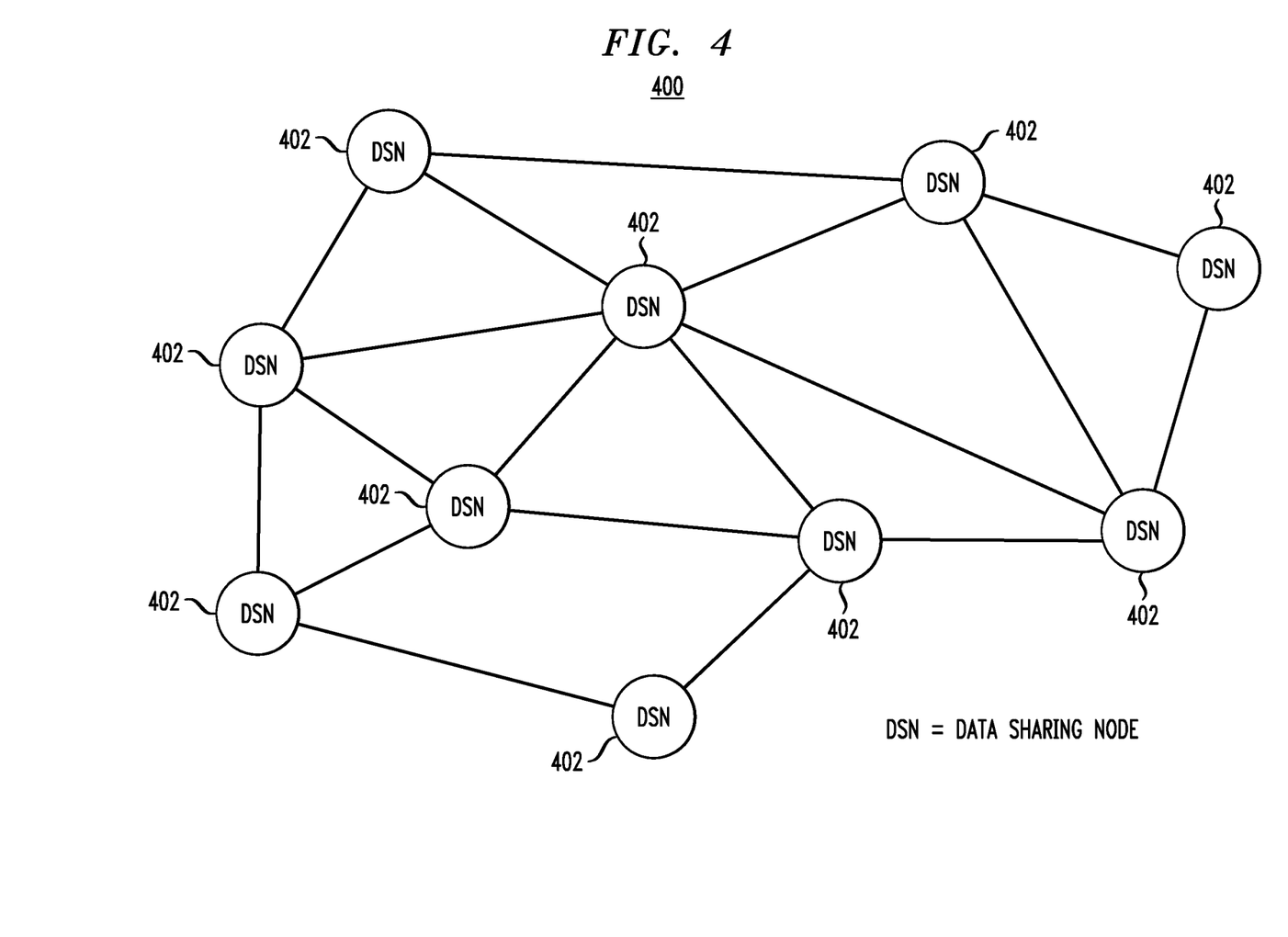
FIG. 4 illustrates a data sharing system for managing data associated with a plurality of computing resources, according to an illustrative embodiment.

FIG. 4 illustrates a data sharing system 400 for managing data associated with a plurality of computing resources, according to an illustrative embodiment. As generally illustrated, a plurality of data sharing nodes (DSNs), each labeled 402, are operatively coupled to form a data sharing system.

In one embodiment, data sharing system 400 may implement the Interplanetary File System (IPFS) protocol. More particularly, IPFS is an open-source protocol that provides a decentralized method of storing and sharing files relying on a content-addressable, peer-to-peer hypermedia distribution. The compute nodes in an IPFS network form a distributed file system. The IPFS protocol was developed to replace the HyperText Transfer Protocol (HTTP) of the Internet which relies on location addressing (i.e., using Internet Protocol (IP) addresses to identify the specific computing resource that is hosting a desired data set). As such, the subject data set must be retrieved from the computing resource where it originated or some computing resource within the content delivery network (CDN) each time the data set is requested.

IPF operates by operatively coupling computing resources with the same system of files via a system of nodes (e.g., DSNs 402 in FIG. 4). More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key (i.e., in form of hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In one example, the IFPS system is further described in J. Benet, "IPFS—Content Addressed, Versioned, P2P File System," 2014, the disclosure of which is incorporated by reference herein in its entirety. However, illustrative embodiments are not limited to this particular data sharing system and alternative systems may be employed.

Accordingly, it is to be understood that each computing resource (e.g., 102, 104, 106, 108, 110 and 112) shown in the extended multi-cloud environment 100 in FIG. 1 either hosts thereon or is otherwise in communication with at least one of the DSNs 402 in FIG. 4. That is, each computing resource in environment 100 is configured to maintain a DHT and to execute the IPFS protocol to retrieve content from one or more other nodes as needed.

It is to be appreciated that one or more DSNs 402 may be co-located with one or more BCNs 202 such that they both reside on one or more of the computing resources 102 through 112 in FIG. 1 or on one or more compute nodes operatively coupled to the computing resources 102 through 112.

Figure 5:
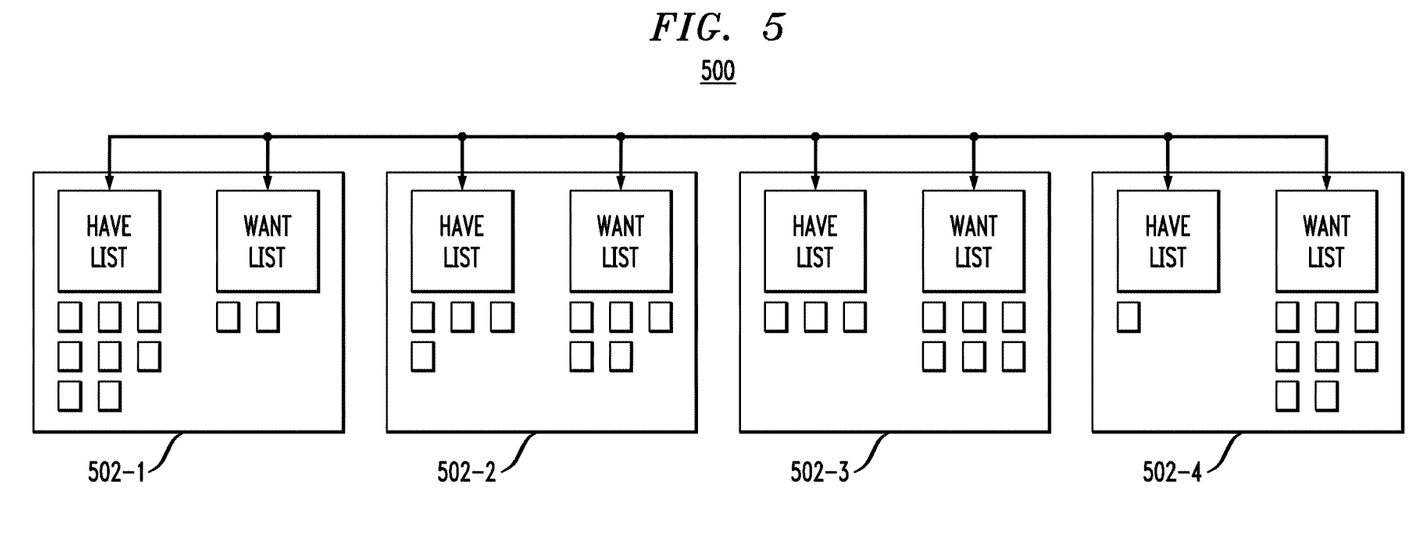
FIG. 5 illustrates a group of data sharing elements of a data sharing system for managing data associated with a plurality of computing resources, according to an illustrative embodiment.

FIG. 5 illustrates a group 500 of data sharing elements (DSNs 402) of a data sharing system for managing data associated with a plurality of computing resources, according to an illustrative embodiment. The nodes 502-1, 502-2, 502-3 and 502-4 represent IPFS installations across an extended multi-cloud environment (e.g., environment 100 in FIG. 1). All IPFS nodes keep a distributed hash table (DHT) to keep track of peers. These nodes also implement a BitSwap protocol to identify which nodes are currently storing which data. Data is moved between nodes by creating a "want list" that can be compared against a neighbor's "have list".

Both lists essentially contain hashes of content. For example, if a virtual reality device (e.g., one of the endpoint devices 112 in FIG. 1) is capturing video images and/or user input, the data can be stored within IPFS as though it were a file, but internally IPFS creates a hash of the content and adds it to the local "have list."

Accordingly, the integration of a distributed ledger system (e.g., 200/300 in FIGS. 2/3) and a data sharing system (e.g., 400/500 in FIGS. 4/5) within an extended multi-cloud environment (e.g., 100 in FIG. 1), as described above, provides a decentralized, peer-to-peer ledger and file system across the entire extended multi-cloud environment. In one or more illustrative embodiments, the term "integration" or "integrated" refers to the fact that the data that each DSN 402 has locally stored, as specified by the DHT, is immutably recorded (in the form of the hash value corresponding to the data) on the distributed ledger accessible via each BCN 202. Such a data management system enables many capabilities, non-limiting examples of which are described below.

Capture of Extended Data Creation.

The creation of new data sets at the very edges of an extended multi-cloud environment (or at any other location in the environment) can now be permanently recorded on a distributed (e.g., organization-wide) ledger. Any distributed ledger transaction can be signed by a unique private key possessed by a distributed ledger node (BCN 202).

Semantic Capture During Extended Data Creation.

In addition to capturing the creation of data, small amounts of data (metadata) can also be added to the ledger that provide additional information about the content (e.g., file type). Additionally, initial statements of data value can be recorded in the distributed ledger.

Capture of IPFS Identifiers.

During content creation, the endpoint, gateway, or other device in the extended multi-cloud environment can store the data in IPFS (data sharing system 400). This creation operation generates a unique content address (e.g., hash value) for the new data. This handle can be added to the distributed ledger. In addition, each IPFS instance has a unique node ID which also can be recorded into the distributed ledger.

Capture of Deletions.

As devices in the extended multi-cloud environment decide to delete content, the decision to delete the content, as well as the reason for deletion, can be recorded in the distributed ledger. This leaves a digital trace that the content was available (and perhaps never made it to the cloud).

Analysis of Data Events Across an Extended Multi-Cloud Environment.

The distributed ledger shared across an extended multi-cloud environment can be viewed from any distributed ledger node. This allows for an administrator to monitor a number of different data events, for example:

The creation of data.
The type of data that is being created.
Where data is being created.
The deletion of data.
The modification of data.
The value of data.
Other data events.

This approach allows for the creation of a type of a data portfolio for an extended multi-cloud environment.

Event-Driven Monitoring.

Monitoring the distributed ledger for extended multi-cloud data activity can result in trigger events that cause data-related actions. For example, consider a health-care cloud that wishes to immediately be notified when treadmill data is captured by an endpoint device or gateway. Once the endpoint device or gateway records the creation of this new data into the distributed ledger, the health-care cloud can see that data creation and take steps to retrieve the data.

Simple Data Movement.

When a distributed ledger node notices an "interesting" event on the distributed ledger, the node has access to the relevant IPFS metadata. This metadata can in turn be provided to a local IPFS instance "want list." This automatically triggers movement of the data from the extended node into the interested node.

Minimizing Deletion and Free Remote Space.

The shared distributed ledger enables interested parties to minimize the chance that data will be lost anywhere in the extended multi-cloud environment (e.g., edge servers, gateways, endpoints, etc.). When a remote IPFS node knows that data has been moved (or copied) and is now reference-able from another IPFS node, the decision can be made to delete the content locally if more space is required on the remote device.

Controlling Remote Deletion Policies.

As monitoring software watches data events across this network, it may detect the appearance of new forms of data, or different forms of data, and may decide to place a priority on this data. The priority can be communicated to the remote devices in order to alter deletion policies. This communication can occur through any number of methods including, by way of example only, the use of the distributed ledger, direct message passing, etc.

Altering Deletion Policies.

Remote devices use their own deletion policies, which may be altered by corporate software monitoring the distributed ledger. As this corporate software instructs remote nodes to hold on to certain types of content for longer periods of time, the remote nodes can alter their deletion policies on the fly.

Proof of Existence.

As data is added to IPFS and provided with a unique content address, this would also provide a cryptographic and unforgeable guarantee that a certain data set was captured by a certain device at a certain time. For instance, this could be used to establish that sensors in a building did or did not record suspicious activity before a fire or other such event, or video capture/facial recognition technologies could thereby establish that a person was present at a certain location at a certain time.

Given the illustrative description of decentralized data management techniques herein, FIGS. 6A through 6D depict methodologies for utilizing a decentralized data management system for managing data across a plurality of computing resources, according to illustrative embodiments.

Figure 6A:
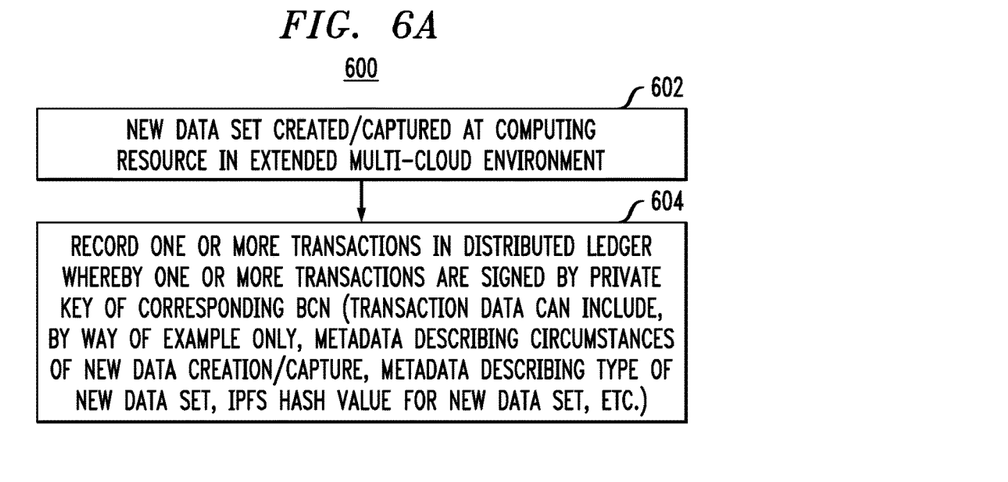
FIGS. 6A through 6D illustrate methodologies for decentralized management of data associated with a plurality of computing resources, according to illustrative embodiments.

In FIG. 6A, methodology 600 comprises the following steps. In step 602, a new data set is created and/or captured at a computing resource in an extended multi-cloud environment. Step 604 records one or more transactions in a distributed ledger whereby one or more transactions are signed by private key of corresponding BCN. Transaction data can include, by way of example only, metadata describing circumstances of the new data creation/capture, metadata describing the type of new data set, an IPFS hash value for the new data set, etc.

Figure 6B:
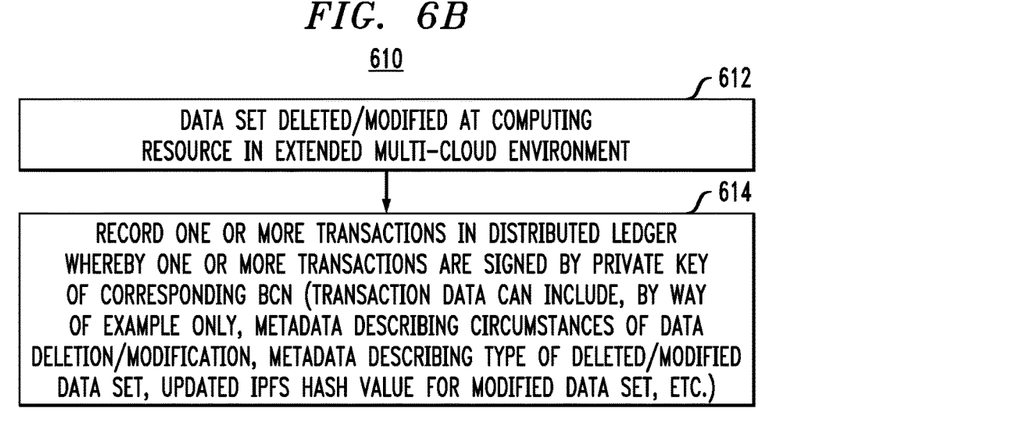

In FIG. 6B, methodology 610 comprises the following steps. In step 612, a data set is deleted and/or modified at a computing resource in an extended multi-cloud environment. Step 614 records one or more transactions in a distributed ledger whereby one or more transactions are signed by private key of corresponding BCN. Transaction data can include, by way of example only, metadata describing circumstances of the data deletion/modification, metadata describing the type of deleted/modified data set, an updated IPFS hash value for the modified data set, etc.

Figure 6C:
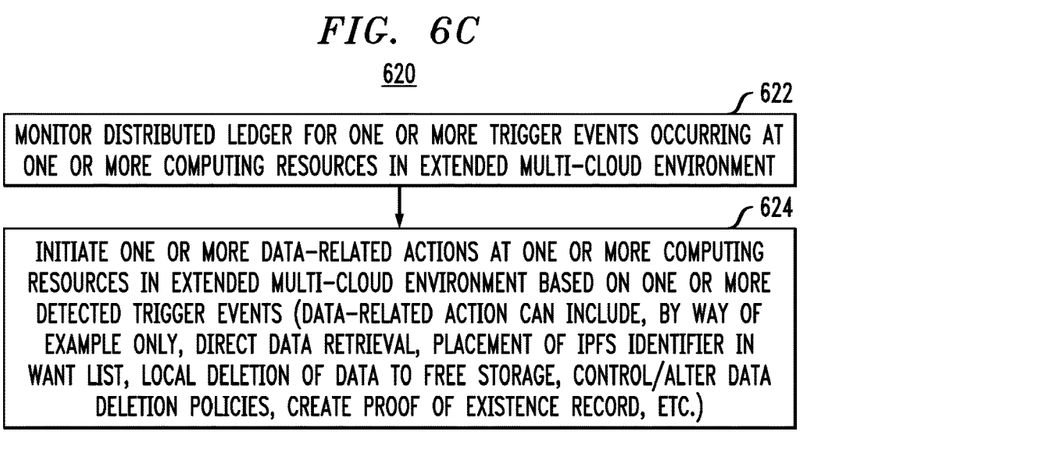

In FIG. 6C, methodology 620 comprises the following steps. Step 622 monitors a distributed ledger for one or more trigger events occurring at one or more computing resources in an extended multi-cloud environment. Step 624 initiates one or more data-related actions at one or more computing resources in the extended multi-cloud environment based on the one or more detected trigger events. Data-related action can include, by way of example only, direct data retrieval, placement of IPFS identifier in want list, local deletion of data to free storage, control/alter data deletion policies, create proof of existence record, etc.

Figure 6D:
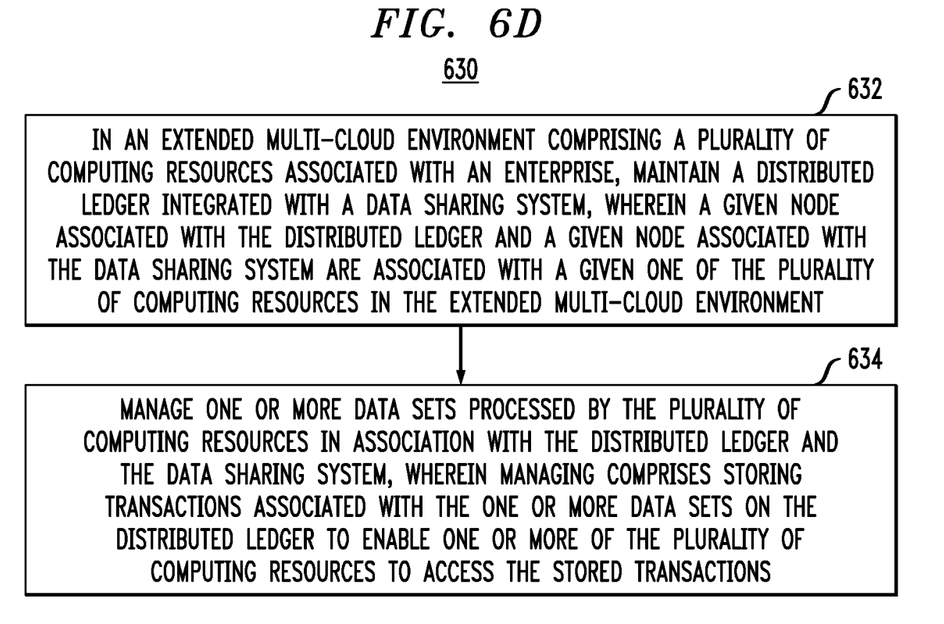

In FIG. 6D, methodology 630 comprises the following steps. In an extended multi-cloud environment comprising a plurality of computing resources associated with an enterprise, step 632 maintains a distributed ledger integrated with a data sharing system, wherein a given node associated with the distributed ledger and a given node associated with the data sharing system are associated with a given one of the plurality of computing resources in the extended multi-cloud environment. Step 634 manages one or more data sets processed by the plurality of computing resources in association with the distributed ledger and the data sharing system, wherein managing comprises storing transactions associated with the one or more data sets on the distributed ledger to enable one or more of the plurality of computing resources to access the stored transactions.

It is to be appreciated that while illustrative embodiments describe decentralized data management from the perspective of an extended multi-cloud environment, the decentralized data management techniques also apply generally to "extended cloud computing environments" where there are multiple cloud platform implementations and, alternatively, single cloud platform implementations.

At least portions of the system for decentralized data management shown in FIGS. 1-6D may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 7.

As is apparent from the above, one or more of the processing modules or other components of the system for decentralized data management shown in FIGS. 1-6D may each run on a computer, server, storage device or other processing platform element. A given such element may be viewed as an example of what is more generally referred to herein as a "processing device." An example of such a processing platform is processing platform 700 shown in FIG. 7.

Figure 7:
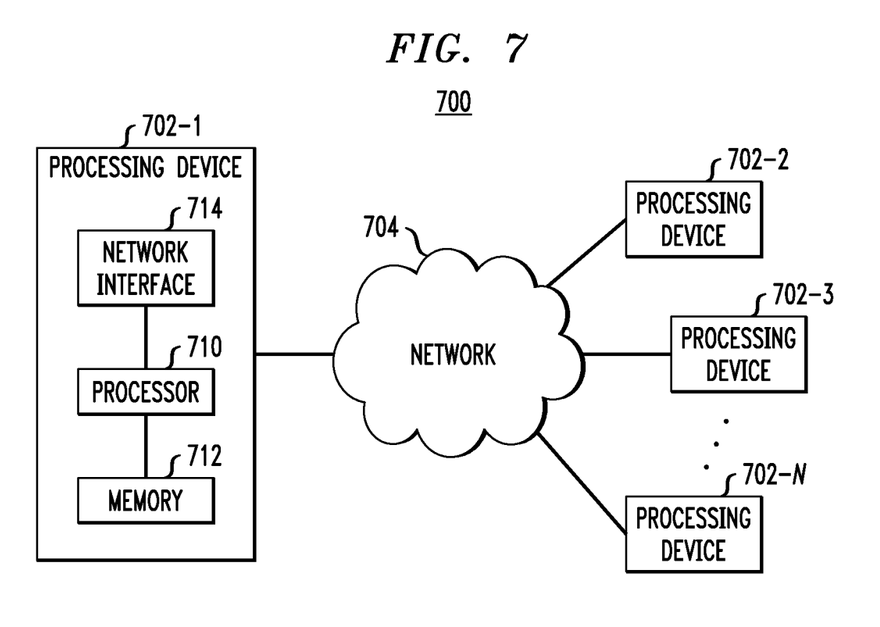
FIG. 7 illustrates a processing platform used to implement a decentralized data management system using a distributed ledger integrated with a data sharing system for managing data associated with a plurality of computing resources, according to an illustrative embodiment.

The processing platform 700 in this embodiment comprises a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 of the example embodiment of FIG. 7 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for decentralized data management, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for decentralized data management. Such components can communicate with other elements of the system over any type of network or other communication media.

As indicated previously, in some embodiments, components of the system for decentralized data management as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for decentralized data management. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
in an extended cloud computing environment comprising a plurality of computing resources associated with an enterprise, maintaining a distributed ledger system integrated with a data sharing system, wherein a given ledger node associated with the distributed ledger system and a given data sharing node associated with the data sharing system are associated with a given one of the plurality of computing resources in the extended cloud computing environment; and
managing one or more data sets processed by the plurality of computing resources in association with the distributed ledger system and the data sharing system, wherein managing comprises storing transactions associated with the one or more data sets on the distributed ledger system to enable one or more of the plurality of computing resources to access the stored transactions;
wherein the distributed ledger system comprises a network of ledger nodes and the data sharing system comprises a network of data sharing nodes forming a distributed file system;
wherein the managing step further comprises:
for a given data set of the one or more data sets, storing the given data set on the given data sharing node of the data sharing system and separately storing a content address of the given data set on the given ledger node of the distributed ledger system;
wherein the content address is independent of origin and location of the given data set within the data sharing nodes forming the distributed file system; and
wherein the method is implemented via one or more processing devices each comprising a processor coupled to a memory.

2. The method of claim 1, wherein, in response to at least one of creation and capture of the given data set by one of the computing resources, recording transaction data for the given data set in the distributed ledger system.

3. The method of claim 2, wherein the transaction data comprises at least one of: metadata describing circumstances of at least one of creation and capture of the given data set; metadata describing the type of the given data set; and a hash value for the given data set generated by the data sharing system.

4. The method of claim 1, wherein, in response to at least one of deletion and modification of the given data set by one of the computing resources, recording transaction data for the given data set in the distributed ledger system.

5. The method of claim 4, wherein the transaction data comprises at least one of: metadata describing circumstances of at least one of deletion and modification of the given data set; metadata describing the type of the given data set; and an updated hash value for the given modified data set generated by the data sharing system.

6. The method of claim 1, wherein the managing step further comprises monitoring the distributed ledger system for one or more trigger events occurring at one or more of the computing resources in the extended cloud computing environment.

7. The method of claim 6, wherein, in response to detecting one or more trigger events, initiating one or more data-related actions at one or more of the computing resources in the extended cloud computing environment.

8. The method of claim 7, wherein the one or more data-related actions comprise at least one of: direct data retrieval, placement of an identifier for the data sharing system in a want list associated with the given data sharing node of the data sharing system, local deletion of data to free storage, control or alter data deletion policies, and create a proof of existence record.

9. The method of claim 1, wherein the distributed ledger system is a blockchain distributed ledger system.

10. The method of claim 1, wherein the extended cloud computing environment is an extended multi-cloud environment.

11. An article of manufacture comprising a non-transitory processor-readable storage medium having stored therein program code of one or more software programs, wherein the program code when executed by at least one processing device causes said at least one processing device to perform the steps of claim 1.

12. A system comprising:
one or more processing devices configured to:
in an extended cloud computing environment comprising a plurality of computing resources associated with an enterprise, maintain a distributed ledger system integrated with a data sharing system, wherein a given ledger node associated with the distributed ledger system and a given data sharing node associated with the data sharing system are associated with a given one of the plurality of computing resources in the extended cloud computing environment; and
manage one or more data sets processed by the plurality of computing resources in association with the distributed ledger system and the data sharing system, wherein managing comprises storing transactions associated with the one or more data sets on the distributed ledger system to enable one or more of the plurality of computing resources to access the stored transactions;
wherein the distributed ledger system comprises a network of ledger nodes and the data sharing system comprises a network of data sharing nodes forming a distributed file system;
wherein the managing step further comprises:
for a given data set of the one or more data sets, storing the given data set on the given data sharing node of the data sharing system and separately storing a content address of the given data set on the given ledger node of the distributed ledger system; and
wherein the content address is independent of origin and location of the given data set within the data sharing nodes forming the distributed file system.

13. The system of claim 12, wherein, in response to at least one of creation and capture of the given data set by one of the computing resources, the one or more processing devices are further configured to record transaction data for the given data set in the distributed ledger system.

14. The system of claim 13, wherein the transaction data comprises at least one of: metadata describing circumstances of at least one of creation and capture of the given data set; metadata describing the type of the given data set; and a hash value for the given data set generated by the data sharing system.

15. The system of claim 12, wherein, in response to at least one of deletion and modification of the given data set by one of the computing resources, the one or more processing devices are further configured to record transaction data for the given data set in the distributed ledger system.

16. The system of claim 15, wherein the transaction data comprises at least one of: metadata describing circumstances of at least one of deletion and modification of the given data set; metadata describing the type of the given data set; and an updated hash value for the given modified data set generated by the data sharing system.

17. The system of claim 12, wherein the one or more processing devices are further configured to perform the managing step by monitoring the distributed ledger system for one or more trigger events occurring at one or more of the computing resources in the extended cloud computing environment.

18. The system of claim 17, wherein, in response to detecting one or more trigger events, the one or more processing devices are further configured to initiate one or more data-related actions at one or more of the computing resources in the extended cloud computing environment, wherein the one or more data-related actions comprise at least one of: direct data retrieval, placement of an identifier for the data sharing system in a want list associated with the given data sharing node of the data sharing system, local deletion of data to free storage, control or alter data deletion policies, and create a proof of existence record.

19. A method comprising:
in an extended cloud computing environment comprising a plurality of computing resources associated with an enterprise, wherein a distributed ledger system integrated with a data sharing system are maintained such that a given ledger node associated with the distributed ledger system and a given data sharing node associated with the data sharing system are associated with a given one of the plurality of computing resources in the extended cloud computing environment;
a given one of the computing resources sending transaction data associated with one or more data sets processed by the given computing resource to the distributed ledger system for storage and access by one or more of the plurality of computing resources;
wherein the distributed ledger system comprises a network of ledger nodes and the data sharing system comprises a network of data sharing nodes forming a distributed file system;
wherein for a given data set of the one or more data sets, storing the given data set on the given data sharing node of the data sharing system and separately storing a content address of the given data set on the given ledger node of the distributed ledger system;
wherein the content address is independent of origin and location of the given data set within the data sharing nodes forming the distributed file system; and
wherein the method is implemented via one or more processing devices each comprising a processor coupled to a memory.

20. The method of claim 19, wherein, in response to at least one of creation and capture of the given data set by one of the computing resources, recording transaction data for the given data set in the distributed ledger system.

\* \* \* \* \*